(12) United States Patent
Clendenning et al.

(10) Patent No.: US 7,125,490 B2
(45) Date of Patent: Oct. 24, 2006

(54) POROUS FILTER (75) Inventors: Michael Andrew Clendenning, Newnan, GA (US); Thomas Henry Ramsey, Peachtree City, GA (US); Tripp Augustus Avett, Newnan, GA (US); Timothy Allen Martin, Newnan, GA (US)

(73) Assignee: Porex Corporation, Fairburn, GA (US)

( * ) Notice: Subject to any disclaimer, the term of this patent is extended or adjusted under 35 U.S.C. 154(b) by 109 days.

(21) Appl. No.: 10/449,305

(22) Filed: May 29, 2003

(65) Prior Publication Data
US 2004/0238440 A1  Dec. 2, 2004

(51) Int. Cl.
*B01D 29/07* (2006.01)
*B01D 29/31* (2006.01)

(52) U.S. Cl. ............... 210/493.4; 210/450; 210/493.1; 210/493.2; 210/493.5; 210/497.01; 210/497.1

(58) Field of Classification Search ............... 210/348, 210/483, 487, 497.01, 435, 493, 499, 455, 210/450, 493.1, 493.2, 493.4, 493.5, 497.1; 55/289, 290, 477, 520, 523
See application file for complete search history.

(56) References Cited

U.S. PATENT DOCUMENTS

| | | | |
|---|---|---|---|
| 1,669,461 A | 5/1928 | Gamble | |
| 2,395,449 A * | 2/1946 | Briggs | 210/489 |
| 2,401,222 A | 5/1946 | Briggs | 210/62 |
| 2,537,992 A | 1/1951 | Gross et al. | 183/71 |
| 2,689,652 A | 9/1954 | Gretzinger | 210/169 |
| 2,801,009 A | 7/1957 | Bowers | 210/493 |
| 3,054,507 A | 9/1962 | Humbert, Jr. et al. | 210/493 |
| 3,058,594 A | 10/1962 | Hultgren | 210/493 |
| 3,174,625 A | 3/1965 | Briggs | 210/493 |
| 3,397,793 A | 8/1968 | MacDonnell | 210/457 |
| 3,407,252 A | 10/1968 | Pall et al. | 264/131 |
| 3,591,010 A * | 7/1971 | Pall et al. | 210/493.1 |
| 3,746,642 A | 7/1973 | Bergstrom | 210/446 |
| 3,799,354 A | 3/1974 | Buckman et al. | 210/493 |
| 3,827,566 A | 8/1974 | Ponce | 210/338 |
| 4,019,987 A | 4/1977 | Krasnow | 210/232 |
| 4,046,697 A | 9/1977 | Briggs et al. | 210/457 |
| 4,072,616 A | 2/1978 | Röhlig | 210/493 |
| 4,251,239 A | 2/1981 | Clyde et al. | 55/132 |
| 4,309,247 A | 1/1982 | Hou et al. | 162/149 |
| 4,488,969 A | 12/1984 | Hou | 210/679 |
| 4,511,473 A | 4/1985 | Hou | 210/348 |
| 4,522,719 A | 6/1985 | Kuwajima et al. | 210/457 |
| 4,578,150 A | 3/1986 | Hou | 162/164.3 |
| 4,596,660 A | 6/1986 | Hou | 210/692 |
| 4,663,041 A | 5/1987 | Miyagi et al. | 210/493.2 |
| 4,693,985 A | 9/1987 | Degen et al. | 436/531 |
| 4,735,720 A | 4/1988 | Kersting | 210/493.5 |
| 4,828,698 A | 5/1989 | Jewell et al. | 210/266 |

(Continued)

*Primary Examiner*—John Kim
(74) *Attorney, Agent, or Firm*—Kilpatrick Stockton LLP; John K. McDonald; J. Clinton Wimbish (57) ABSTRACT

A filter has a longitudinal axis with an inner diameter defined by a hollow longitudinally extending center. The filter has fingers extend radially outwardly arcuately from the longitudinal axis. The fingers have base ends near the longitudinal axis and outer edges at extremities spaced from the longitudinal axis. The outer diameter of the filter is defined by the outer edges of the fingers. The filter is formed from a sintered porous molded thermoplastic or another material resulting in a filter more rigid than standard filters. The fingers are spaced apart from one another a predetermined, substantially fixed distance to form slots therebetween sized to capture contaminants therein.

25 Claims, 5 Drawing Sheets

U.S. PATENT DOCUMENTS

| | | | |
|---|---|---|---|
| 4,878,930 A | 11/1989 | Manniso et al. | 55/493 |
| 4,882,055 A | 11/1989 | Stamstad | 210/483 |
| 4,929,354 A | 5/1990 | Meyering et al. | 210/321.61 |
| 5,004,645 A | 4/1991 | Tallentire et al. | 428/323 |
| 5,084,178 A | 1/1992 | Miller et al. | 210/493.5 |
| 5,098,565 A * | 3/1992 | Drori | 210/346 |
| 5,174,896 A | 12/1992 | Harms, II | 210/455 |
| 5,204,002 A | 4/1993 | Belfort et al. | 210/634 |
| 5,232,595 A * | 8/1993 | Meyer | 210/493.1 |
| 5,250,094 A * | 10/1993 | Chung et al. | 55/523 |
| 5,250,179 A | 10/1993 | Spearman | 210/315 |
| 5,252,207 A | 10/1993 | Miller et al. | 210/335 |
| 5,275,743 A | 1/1994 | Miller et al. | 210/767 |
| 5,316,677 A * | 5/1994 | Harms, II | 210/455 |
| 5,403,482 A | 4/1995 | Steere et al. | 210/489 |
| 5,462,675 A | 10/1995 | Hopkins et al. | 210/767 |
| 5,472,606 A * | 12/1995 | Steere et al. | 210/489 |
| 5,478,372 A | 12/1995 | Stark | 55/521 |
| 5,543,047 A | 8/1996 | Stoyell et al. | 210/493.2 |
| 5,578,208 A | 11/1996 | Miki et al. | 210/487 |
| 5,620,599 A | 4/1997 | Hopkins et al. | 210/420 |
| 5,672,188 A | 9/1997 | Choi | 55/485 |
| 5,690,765 A | 11/1997 | Stoyell et al. | 156/69 |
| 5,725,784 A | 3/1998 | Geibel et al. | 210/791 |
| 5,755,963 A | 5/1998 | Sugiura et al. | 210/493.1 |
| 5,776,343 A | 7/1998 | Cullen et al. | 210/483 |
| 5,789,351 A | 8/1998 | Ahmed et al. | 507/203 |
| 5,804,074 A * | 9/1998 | Takiguchi et al. | 210/497.01 |
| D402,734 S | 12/1998 | Rao et al. | D23/209 |
| 5,868,933 A | 2/1999 | Patrick et al. | 210/484 |
| 5,871,645 A | 2/1999 | Reed et al. | 210/493.2 |
| 5,876,601 A | 3/1999 | Geibel et al. | 210/493.1 |
| 5,879,560 A | 3/1999 | Seeley et al. | 210/678 |
| 5,882,288 A | 3/1999 | Paul et al. | 493/379 |
| 5,902,482 A | 5/1999 | Seeley et al. | 210/493.1 |
| 5,911,883 A | 6/1999 | Anderson | 210/679 |
| 5,919,363 A * | 7/1999 | Aldred et al. | 210/232 |
| 5,988,400 A | 11/1999 | Karachevtcev et al. | 210/483 |
| 6,048,298 A | 4/2000 | Paul et al. | 493/451 |
| 6,103,120 A | 8/2000 | Hopkins et al. | 210/497.1 |
| 6,110,368 A | 8/2000 | Hopkins et al. | 210/497.1 |
| 6,113,784 A | 9/2000 | Stoyell et al. | 210/493.2 |
| 6,241,220 B1 | 6/2001 | Blackwell et al. | 261/38 |
| 6,264,936 B1 | 7/2001 | Sawan et al. | 424/78.26 |
| 6,315,130 B1 | 11/2001 | Olsen | 210/490 |
| 6,402,800 B1 | 6/2002 | Rey | 55/498 |
| 6,422,395 B1 | 7/2002 | Verdegan et al. | 210/411 |
| 6,428,594 B1 | 8/2002 | Hintenlang et al. | 55/498 |
| 6,511,599 B1 | 1/2003 | Jaroszczyk et al. | 210/493.5 |
| 2002/0060183 A1 | 5/2002 | Paul et al. | 210/457 |
| 2003/0205518 A1 | 11/2003 | VanderKooi et al. | 210/315 |
| 2004/0065605 A1* | 4/2004 | Pearson et al. | 210/315 |

* cited by examiner

POROUS FILTER

FIELD OF THE INVENTION

The present invention relates to a fluid filter for filtering out contaminants or other particles. More particularly, the present invention relates to a fluid filter having an increased filtering capacity.

BACKGROUND OF THE INVENTION

Filters for fluids (liquids and gases) have been known in the art. For instance, filters are commonly used in such systems as air filtration systems, water filtration systems, water purification systems, etc. One particular application of filters is in recreational waters, such as pools and spas.

At least two types of filters are known. The first type of filter is a cartridge-type filter with a replaceable filter typically mounted on a core and placed in the filtration system. The replaceable filter is typically formed from a porous, relatively soft material having pores sized to prevent contaminants and/or other particles (hereinafter "contaminants" for the sake of convenience, without intent to limit) from flowing through the filtration system, while letting the fluid pass therethrough. However, contaminants and particles typically become embedded in such filters such that the filters must be replaced on a regular basis.

The second type of filter is a Diatomaceous Earth ("DE") filter having a support grid resembling a nylon mesh on which a powder is deposited. The powder forms a uniform cake-like structure that performs the filtration operation. However, the support grid is relatively fragile and has a limited life. Moreover, such a support grid system assembly is complex and thus relatively difficult to assemble.

Typically, cartridge-type filters are cylindrical elements having a substantially open longitudinal center portion with radially-outwardly extending, longitudinal folded portions or pleats. A plurality of pleats are commonly arranged around a tubular core defining a cylinder. When viewed in a transverse cross-section, the pleats typically extend radially outward from the core toward the outer periphery of the filter. Conventional pleats extend in a straight manner from the inner diameter of the filter (the core) toward the outer diameter (the periphery) of the filter. A drawback of the straight pleat is that, because the filter industry has become standardized, the overall dimensions of the filter body are restricted and a straight pleat cannot be increased in size beyond the dimension of the filter body. Thus the filter capacity and effectiveness are limited.

Because the effectiveness of the standard cartridge-type filter is generally a function of the surface area of the filter, pleats have been modified to extend from the center core toward the periphery in an arched manner. Thus, the effective length of each pleat between an inner diameter and outer diameter can be increased. The increase in the length of each pleat results in an increased surface area of the filter.

In standard cartridge-type filters, to increase the effectiveness of a typical filter, the volume of empty space within the filter body has traditionally been targeted as wasted space. Attempts have been made to approach filling 100% of the volume of the filter body, between the open center core and the periphery, with filter material. Furthermore, the curvature of each pleat between an ascending and descending arm of the pleat has been modified to decrease empty volume at the distal and proximal ends of each respective pleat. The pleats were also designed to contact one another such that minimal empty volume exists between two adjacent pleats. Adjacent pleats often lie directly on neighboring pleats such that adjacent pleats are in intimate contact with each other. The curvature of pleats is typically modified such that the empty volume of the overall filter is reduced to nearly zero.

However, several drawbacks of the traditional system exist. Because the pleats are in intimate contact, any large particles that enter the filter have no particular position in which to become positioned or trapped. The large particles therefore become lodged in unpredicted and unwanted positions and can create dead spaces, disrupting proper functioning of the filter. Furthermore, because the pleats are in intimate contact, any contaminants that enter the filter become lodged within the inter-pleat space and are not fully removable. Therefore, the filter is not entirely cleanable and has a very limited reusable life. The filter also cannot be washed, brushed aggressively, or backwashed at high pressure because of its relative fragility. Therefore, the filter must be disposed of when it becomes contaminated.

Porex Porous Products Group, Fairburn, Ga. has improved upon the above filters by forming a molded filter element, preferably formed from a sintered porous plastic. The sintered porous plastic material used to form these filters provides a more durable composition and therefore permits the filter to be more effectively cleaned and reused over a longer period of time. For instance, the sintered porous plastic permits the filter to be repeatedly backwashed and cleaned. Backwashing is where a clean fluid is flown in a reverse direction from the normal direction of flow across a filter. The reverse flow dislodges particles that were previously trapped by the filter, thereby cleaning the filter for later use. Additionally, the sintered porous plastic is predominately uniform in composition and therefore the filter flow is not direction specific. A substance to be filtered can flow from the outside in as well as from the inside out.

Furthermore, because the sintered porous plastic filter is more rigid than the first type of filter described above, the Porex filters do not require a central core or an outer cage to provide a specific form and structure. The sintered porous plastic is capable of being formed into a shape and structure independent of employing a central core and outer cage. Moreover, molding permits the filter to be formed as a single piece, thus minimizing parts and simplifying manufacture as well as assembly.

Yet another benefit of the sintered porous plastic is that the pore size can be modified as desired. The pore size of the sintered material is dependent on the size and shape of the initial starting particles prior to sintering. Adjusting and determining the pore size based on the starting particle size and shape is described in U.S. Pat. No. 6,551,608 issued to Yao; U.S. Published Application No. U.S. 2003-0062311-A1; and U.S. Pending Application Ser. No. 09/375,383, each of which is incorporated herein by reference in its entirety.

It would therefore be desirable to form a filter that has a uniform surface for removing contaminants of multiple sizes, an increased filtering capacity, and an effective service life. It would further be desirable to form a filter having an increased capacity to capture contaminants and to form the filter so that it may be backwashed to clean off the contaminants so that the filter may be reused. Also, the surface preferably would be configured to retain the contaminants thereon, without creating dead spaces and blocking proper filter functioning.

SUMMARY OF THE INVENTION

The present invention provides a filter configured and dimensioned to filter contaminants from a filtrate. The filter of the present invention provides an increased capacity and capability to filter contaminants, such as by having an increased surface area. The increased surface area is generated by a plurality of longitudinal fingers extending radially outwardly and arcuately and positioned a predetermined distance from adjacent fingers. Furthermore, due to the structure of the filter, filtered contaminants are controlled and accommodated such that the filter retains a high filtering capacity. The filter also provides a plurality of spaces configured and dimensioned to capture contaminants in a substantially symmetrical manner, such that no portion of the filter becomes over-contaminated with such a high concentration of contaminants as to become ineffective in filtering a filtrate.

In accordance with the principles of the present invention, a filter with increased surface area for filtration is formed by molding a material into the shape of a filter having a plurality of radially-outwardly formed or molded portions (hereinafter "fingers") that are curved circumferentially. Such configuration permits increased surface area for filtration because the curved configuration of the fingers affords a longer finger length (the length of the finger from its base, at the inner diameter of the filter, to its edge, at the outer diameter of the filter) than would be afforded by fingers that extend in a straight radially-outward direction. Thus, the fingers of the filter of the present invention permits a higher filtering capacity than the surface area provided by fingers that extend radially-outwardly in a straight line. Moreover, the spaces or slots between the fingers are larger than in the straight-fingered filters. Thus, the filter slots have a higher capacity for holding contaminants than the straight-fingered filters.

The filter is preferably formed from a relatively rigid or durable material so that the filter can be readily cleaned, such as by a brush or by backwashing (e.g., hosing the filter down with water or another cleaning medium). Moreover, the rigidity of the filter permits the filter to be used without a core if desired.

The material used to form the filter of the present invention is preferably a sintered porous plastic molded into the desired filter shape. Such material permits porosity of the material of the filter to be controlled, such as by controlling the geometry of the porous plastic powder.

The fingers of the filter preferably are spaced apart from one another at a spacing configured such that the spaces between the fingers (hereinafter the "slots") catch contaminants of a particular size. Also, because the fingers are spaced apart from one another at a substantially fixed distance, the contaminants trapped by the filter can be readily cleaned off and the filter can be reused.

Because the material of the filter of the present invention is somewhat flexible, the fingers are capable of being spread apart when positioned in a filtration system. Thus, the slots can be further expanded for even greater contaminant holding capacity.

These and other features and advantages of the present invention will be readily apparent from the following detailed description of the invention, the scope of the invention being set out in the appended claims.

BRIEF DESCRIPTION OF THE DRAWINGS

The detailed description will be better understood in conjunction with the accompanying drawings, wherein like reference characters represent like elements, as follows.

DETAILED DESCRIPTION OF THE INVENTION

Figure 1:
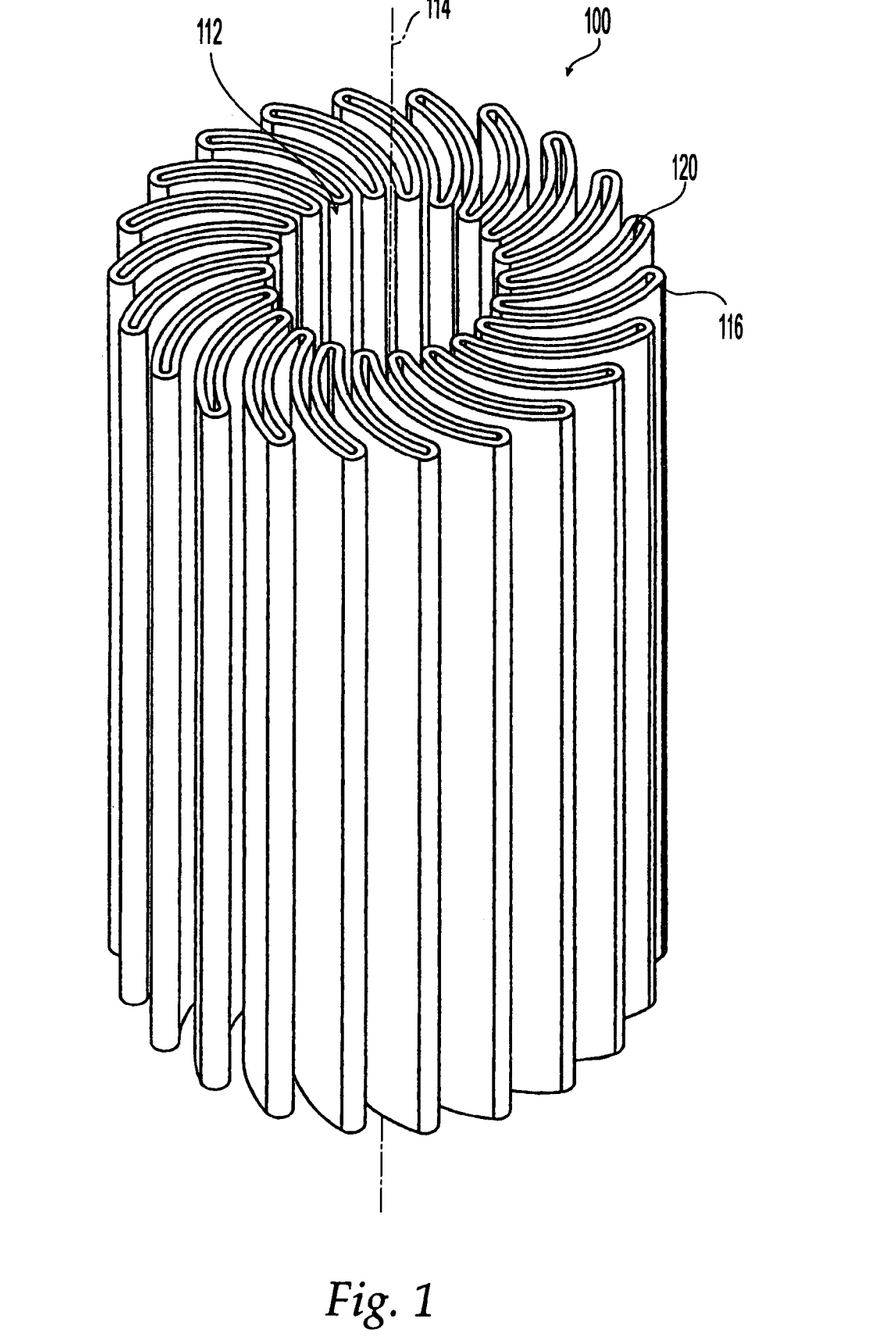
FIG. 1 shows a perspective view of a filter according to an embodiment of the present invention.

According to FIG. 1 filter 100 of the present invention is preferably constructed with hollow center 112 having longitudinal axis 114 therethrough. Typically, filter 100 is formed in generally a cylindrical shape. Filter fingers 116 extend longitudinally radially and arcuately outward from hollow center 112 toward the outer periphery of filter 100. Hollow center 112 defines an inner diameter and the periphery of filter fingers 116 defines an outer diameter. Filter 100 of the present invention preferably permits flow from hollow center 112 of filter 100 to the outside periphery of filter 100, as well as flow from the outside periphery of filter 100 to inside hollow center 112 of filter 100.

In accordance with the principles of the present invention, the length of fingers 116 may be increased without affecting any size limitations on filter 100 (such as restrictions on the inner and outer diameters of the overall filter) by radiusing or curving fingers 116 in a circumferential direction. Fingers 116 are radiused to permit an increased surface area on which contaminants can be held, thereby increasing the filtering capacity of filter 100, such as by permitting the holding of a larger quantity of contaminants, while retaining set overall filter dimensions. The increased finger size also may serve to increase the overall mechanical strength of filter 100. For instance, the length of finger 116 may act as a support wall for contaminants or as a support grid for a filter aid. Furthermore, by radiusing fingers 116, filter 100 may become structurally stronger, thereby reducing or even eliminating the need for an internal core or cage (not shown) for support. However, in the situation or application where a core is required, the radiusing of fingers 116 nonetheless provides for the effective use of the core as a slot expander which, in turn, increases the quantity of contaminants controlled by filter 100. Thus, the radius of curvature of fingers 116 may be selected to maximize any of the above benefits. As may be appreciated by one of ordinary skill in the art, the selection of the radius of curvature may be affected by the material of filter 100, the environment in which filter 100 is to be used, or other relevant considerations. It is contemplated that the radius of curvature of fingers 116 can be roughly 1.307 inches (3.32 cm).

Figure 3:
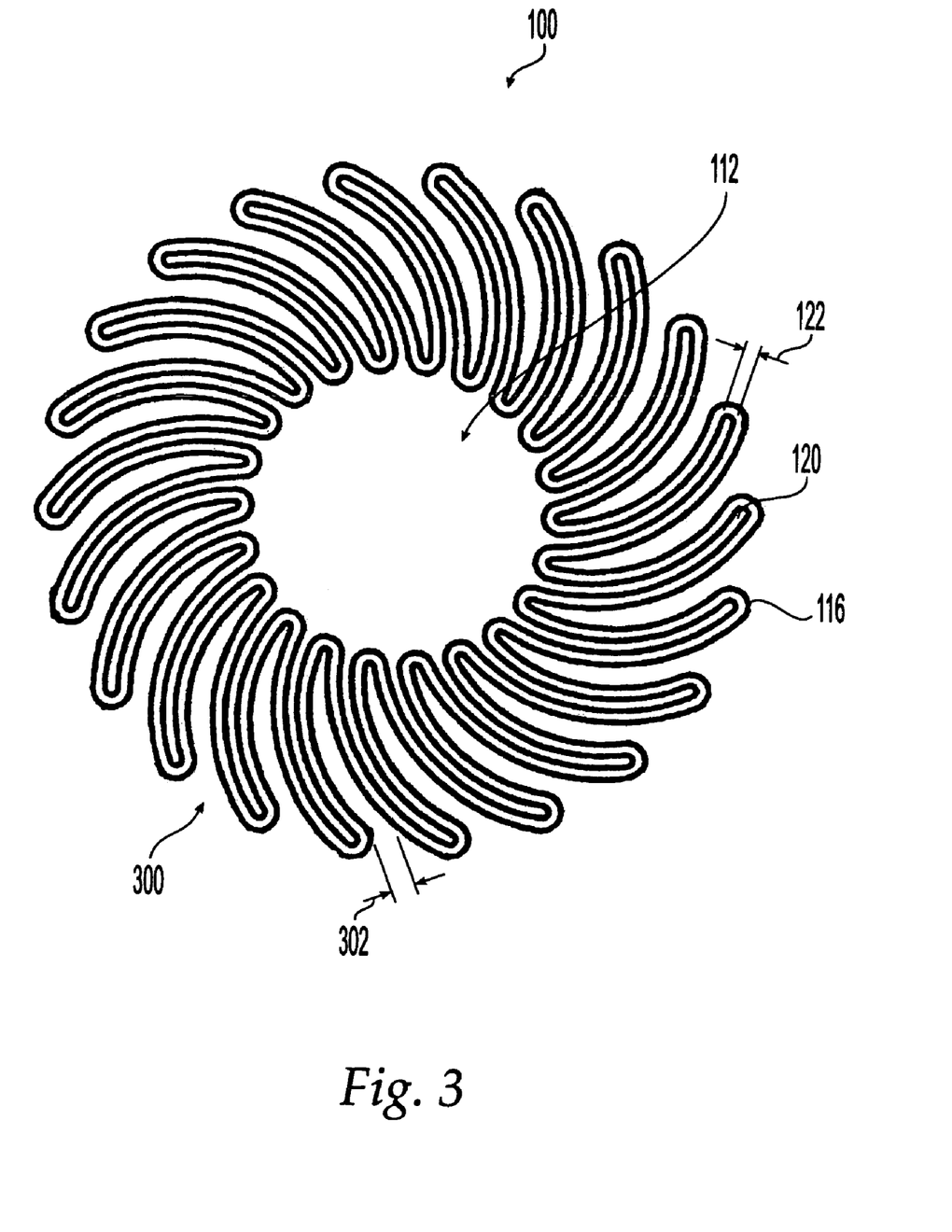
FIG. 3 shows an end view of the filter according to FIG. 1.

As shown in FIG. 3, the increased finger length of filter 100 also results in an increase in slot spacing 302 of slots 300 between fingers 116 compared to the slot length in straight-slotted filters (not shown). Thus, filtering capacity is further increased. Further, a greater quantity of particles can be trapped by filter 100 than previously possible because of the increased slot spacing 302. It will be appreciated that the larger slots 300 become, the greater the number of particles capable of being captured or held therein. The increased size and unique shape of slots 300 also permits improved accessibility thereto, such as for cleaning. In use, the predetermined slot spacing 302 between adjacent individual fingers 116 is selected by the desired filtering capacity of filter 100 for a particular application. Some criteria used to select slot spacing 302 are dependent upon the environment in which filter 100 is to be used. Some such criteria include, but are not limited to the contaminant load in the fluid to be filtered and the like. For example, the higher the contaminant load in the fluid to be filtered, the larger slot spacing 302 is needed between fingers 116 to control the contaminant load. It is contemplated that slot spacing 302 can be selected to equal the thickness of a finger 116 multiplied by a minimum of about 0.60 and a maximum of about 2.0. The multiplier is determined by factors including contaminant load of the fluid to be filtered and the like, as described above. In one contemplated embodiment, slot spacing 302 between fingers 116 is about 0.035 inches (0.088 cm).

The material of filter 100 of the present invention is preferably somewhat flexible. Thus, although fingers 116 are spaced apart a substantially fixed distance, fingers 116 nevertheless are capable of being spread apart when positioned in a particular filtration system. For example, a core (not shown) having an outer diameter larger than the inner diameter of filter 100 can be fitted into filter 100 because filter 100 is flexible. As a result, the size of slots 300 expand, thereby, increasing the contaminant capturing and holding capacity of slots 300. This also better facilitates cleaning of filter 100. Such expansion possibility thus permits even greater filtration capacity and capability than that of current filters. Furthermore, with the insertion of a core, filter 100 has an improved ability to be used as a support grid for a Diatomaceous Earth filter, such that Diatomaceous Earth elements may be applied to the surface of filter 100 in a discrete and uniform manner.

Filter 100 of the present invention is preferably formed as a molded element. Thus, filter 100 may be formed as a one-piece element, if desired, thereby simplifying manufacturing. Furthermore, forming filter 100 as a one-piece element also simplifies assembly of filter 100 itself. Moreover, a one-piece filter is simpler to assemble into a filtration system than is a multiple-part filter.

Molding of filter 100 also permits formation of filter 100 in various shapes, configurations, sizes, etc. Thus, the desired configuration of filter 100 is readily achieved by the molding process, and further manufacturing steps to achieve the desired configurations, such as to curve fingers 116 of the mold, are generally unnecessary.

Because filter 100 is molded there is more control over the shape and configuration of fingers 116. Furthermore, filter 100 is also preferably constructed in one continuous manner such that there are no seams where two or more ends of the material are joined. For instance, it may be desirable to provide fingers 116 with rounded outer edges to facilitate cleaning and/or handling of filter 100. Rounding of the outer edges of fingers 116 also facilitates removal of filter 100 from the mold. Rounding of the outer edges of fingers 116 also eliminates positions where contaminant particles can evade cleaning, such that the entire surface area of filter 100 can be effectively cleaned. Additionally or alternatively, it may be desirable to provide slots 300 with rounded bases. Slots with rounded bases permit various advantages over prior art slots, such as improved cleanability. Also, if the bases of slots 300 are rounded, particles are less prone to be trapped at the bases of the slots.

In forming filter 100, each finger 116 is arched on an inner or proximal end and on a peripheral or distal end as each finger 116 loops back on itself to form the individual fingers 116. Each looping or arching at the proximal and distal ends of fingers 116 is configured with a predetermined minimum radius value such that fingers 116 are spaced apart from one another a predetermined slot spacing 302. A minimum radius of curvature is required and dictated by factors that include, but are not limited to, optimizing flow dynamics, ease of cleaning, pre-coating of filter aids, release of contaminants during backwashing, optimizing mold release during manufacturing, and the like. Other factors include forming no sharp edge or corner which would prevent effective cleaning of the entire surface area of filter 100. It is contemplated that the arch or loop at the proximal ends of fingers 116 have an inner radius of at least about 0.030 inch (0.076 cm) and an outer radius of at least about 0.130 inches (0.330 cm). The slots at the distal ends of fingers 116 have an inner radius of at least about 0.050 inches (0.127 cm) and an outer radius of at least about 0.150 inches (0.381 cm). The maximum radius of curvature at the proximal end or base and distal end of the fingers 116 is not bound by any value. The maximum value will be dictated by the particular application or use for filter 100. It will be appreciated by one of ordinary skill in the art that the criteria for setting minimum value generally are not applicable at the upper value range. For example, a large radius of curvature generally does not inhibit or restrict cleaning, backwashing, mold releasing, coating of the filter, or the like.

In an alternative embodiment, the radius of curvature of the arch or loop at the proximal end of fingers 116 can be different from the radius of curvature of the arch or loop at the distal ends of fingers 116. A varying radius of curvature at the proximal and distal ends of fingers 116 can vary the size of slot 300 for a particular filtering application. Furthermore, different radius of curvatures at the proximal and distal end of fingers 116 produce slots 300 and fingers 116 of varying shapes and angles. This creates further variety in the size and configuration of filter 100 to accommodate a variety of applications.

Each finger 116 also defines an internal slot 120. Internal slot 120 is defined between the radially extending sides of fingers 116. The size and spacing of internal slot 120 is determined, at least partially, by the flow dynamics which are required by a filtering application. Internal slot 120 is sized and spaced to facilitate cleaning and backwashing so filter 100 can be cleaned and reused. Furthermore, the width 122 of internal slot 120 is generally at least equal to the wall thickness of filter 100. It is contemplated that internal slot 120 can have width 122 of at least about 0.10 inches (0.254 cm) in width. It will be appreciated by one of ordinary skill in the art that the criteria for setting minimum value generally are not applicable at the upper value range. For example, a large internal slot width does not inhibit or restrict cleaning, backwashing, mold releasing, coating of the filter, or the like.

Figure 2:
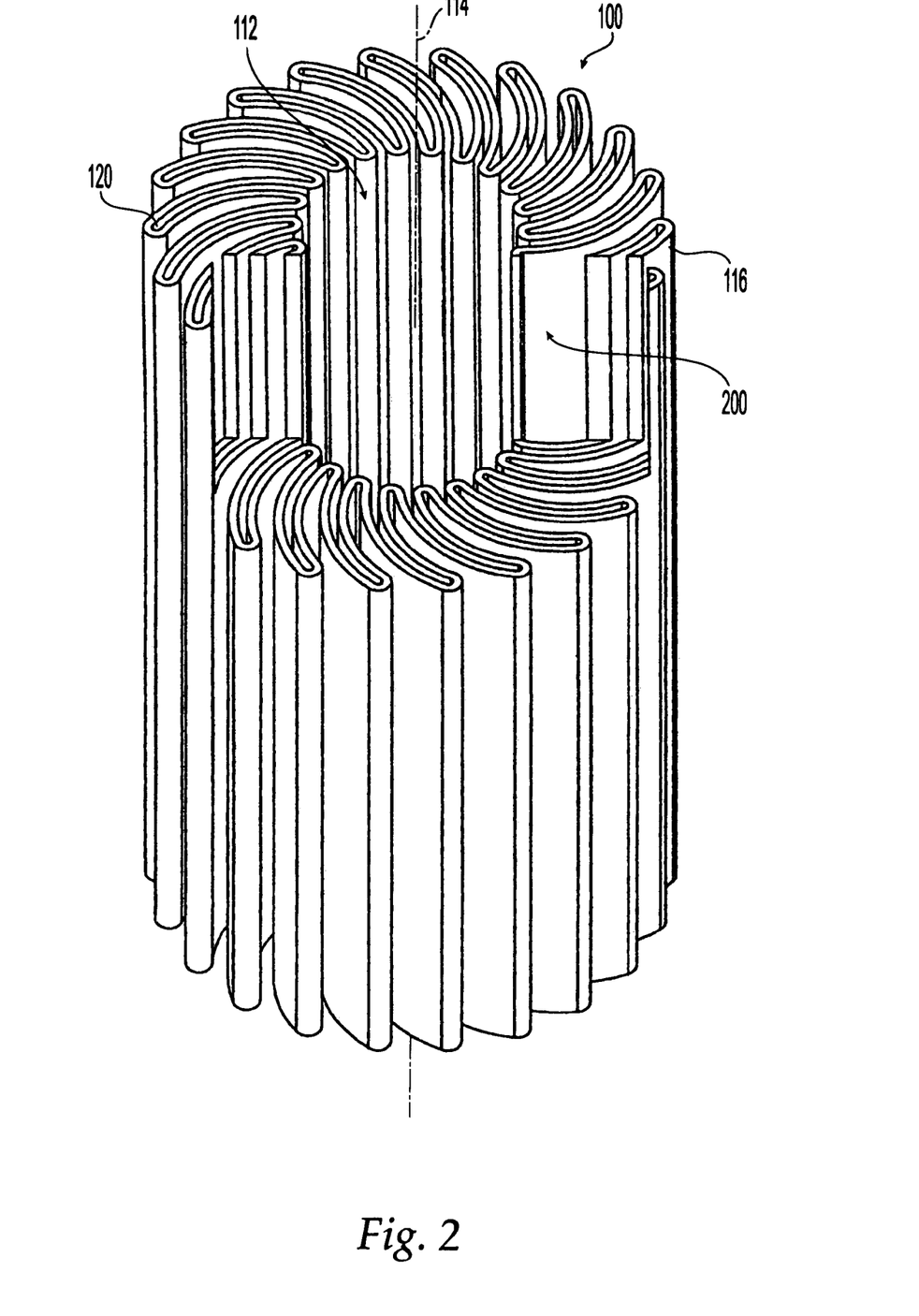
FIG. 2 shows a partially cut away perspective view of the filter according to FIG. 1.

As shown in FIG. 2, molding also permits the material of filter 100 to be formed as a single layer rather than as a multi-layer media as in the prior art. When contaminants filter into or in between the layers of a multi-layer filter, the contaminants often become trapped and can not be removed. Therefore, multi-layer filters generally are not amenable to cleaning and reuse. Filter 100 of the present invention is preferably formed from a single-layer material. Therefore, filter 100 is cleanable and reusable because the trapped contaminants can be cleared by backwashing. Furthermore, because filter 100 is constructed in a single layer there are almost no limitations on the curvature of fingers 116. The filtering, support, and drainage capacities of filter 100 are not inhibited by the configuration fingers 116 are molded into, whereas in the prior art, the configuration of the multi-layered filters was limited because the drainage and filtering capacities would become impaired in many configurations.

Various modifications to various features of filter 100 may be readily achieved by molding filter 100. For instance, if desired, the length of fingers 116 (measured from the base of finger 116, at the inner diameter of filter 100, to the free end of finger 116, at the outer diameter of filter 100) can be readily varied (e.g., fingers 116 may have varied lengths) as desired. Alternatively or additionally, surface 200 (see FIG. 2) of fingers 116 or slots 300 of filter 100 can be modified to incorporate desired texturing or the like. For example, surface 200 of fingers 116 can have ridges or can have serpentine grooves or slots. Also, each finger 116 can have a serpentine or helical shape in the longitudinal or radial direction. Moreover, the outer surface of the entire filter 100 can be readily modified as desired. For example, surface 200 of filter 100 may be textured. Furthermore, because adjacent individual fingers 116 do not touch neighboring fingers, surface 200 of each finger 116 can include micro-fingers (not shown). The micro-fingers can help in trapping contaminant particles in-place, once stopped by filter 100. Modifications to surface 200 of fingers 116 also increase the overall surface area of filter 100, and therefore increase the effectiveness of filter 100.

The characteristics of a sintered porous material can depend on the average size and distribution of the particles used to make it as well as the particles' average shape. In one embodiment of the invention, the thermoplastic particles are substantially spherical. This shape provides certain benefits. First, it facilitates the efficient packing of the particles within a mold. Second, substantially spherical particles, and in particular those with smooth edges, tend to sinter evenly over a well defined temperature range to provide a final product with desirable mechanical properties and porosity. Typical pore size starting approximately at 5 µm and up to approximately 500 µm is preferred, however, smaller and larger pore sizes are also possible. For example, the pore sizes can be as low as about 1 µand as high as about 500 µ, whereas the porosity can be as low as about 30% and as high as about 90%. Pore size and porosity selection is obvious to one of ordinary skill in the art depending on the process and/or the starting material selected.

The material used to form filter 100 can be made with functional characteristics, such as antimicrobial activity, chlorine reduction, or the like. The material of filter 100 can be treated to be antibacterial, such as by incorporating antimicrobial treatments into or onto the material. Such treatment addresses and corrects a common problem of bacterial growth in or on filters.

Some suitable antiviral or antimicrobial agents are disclosed in U.S. Pat. No. 6,551,608 to Yao, the disclosure of which is herein incorporated by reference. Some antiviral or antimicrobial agents include, but are not limited to: phenolic and chlorinated phenolic compounds; resorcinol and its derivatives; bisphenolic compounds; benzoic esters; halogenated carbanilides; polymeric antimicrobial agents; thazolines; trichloromethylthioimides; natural antimicrobial agents; metal salts; broad-spectrum antibiotics, and mixtures thereof. Preferred antiviral or antimicrobial agents include, but are not limited to: 2,4,4'-trichloro-2'-hydroxy-diphenyl ether; 3-(4-chlorophenyl)-1-(3,4-dichlorophenyl)urea; poly (iminoimidocarbonyl iminoimidocarbonyl iminohexamethylene hydrochloride); silver ions; salts; mixtures thereof; or the like.

The material of filter 100 can alternatively or additionally be treated to be hydrophobic or oleophobic, such as desirable for waste water treatment filtration or metal finishing shops utilizing lubricants to work the metals, whereby the shavings are readily caught by slots 300 and the lubricants are retained by the oleophobic properties of the filter material. Thus, the oil and the metal shavings can then be flushed off and filter 100 can be reused. Any other desired functional characteristics may be imparted, such as dictated by the environment in which the filter is to be used. Although a coating, as necessary in typical prior art filters, is not necessary on filter 100 of the present invention, a coating can nonetheless be used if different surface characteristics are desired. For example, a coating making filter 100 more hydrophilic or more hydrophobic may be applied if the desired application of filter 100 so demands, for example, a fluoropolymer coating could be used to enhance release characteristics.

The filter material of the present invention is preferably a sintered porous thermoplastic substrate. Some suitable base materials that can be used to provide the porous thermoplastic substrate are described in U.S. Pat. No. 6,551,608 to Yao; Pending U.S. Published Application No. U.S. 2003-0062311-A1, both of which are incorporated herein by reference in their entirety. Suitable thermoplastics for use in forming filter 100 of the present invention include, but are not limited to, polyolefins, nylons, polycarbonates, poly (ether sulfones), and mixtures thereof, as well as fluoropolymers, such as pvdf and ptfe. A preferred thermoplastic is a polyolefin. Examples of suitable polyolefins include, but are not limited to: ethylene vinyl acetate; ethylene methyl acrylate; polyethylenes; polypropylenes; ethylene-propylene rubbers; ethylene-propylenediene rubbers; poly(1-butene); polystyrene; poly(2-butene); poly(1-pentene); poly (2-pentene); poly(3-methyl-1-pentene); poly(4-methyl-1-pentene); 1,2-poly-1,3-butadiene; 1,4-poly-1,3-butadiene; polyisoprene; polychloroprene; poly(vinyl acetate); poly(vinylidene chloride); and mixtures and derivatives thereof. A preferred polyolefin is polyethylene. Examples of suitable polyethylenes include, but are not limited to, low density polyethylene, linear low density polyethylene, high density polyethylene, ultra-high molecular weight polyethylene, and derivatives thereof. In alternative embodiments the filter material may also be composed of or formed from sintered metal, steel mesh, woven metal, ceramic materials, non-woven materials, bi-component, continuous, or staple fiber media using an extrusion or pultrusion process. It would be obvious to one of ordinary skill in the art to produce the filter described herein from these later-described materials and/or processes.

Preferably, filter 100 is molded from sintered porous plastic. According to an embodiment of the invention the mold is filled with sintered porous plastic powder and the particles are fused together by heating to form the finished material of filter 100 in the shape of the mold. Because of such molding process, filters of any desired shape, configuration, or dimensions may be readily formed from a porous material in one continuous and contiguous piece.

Examples of polyolefins suitable for use in the invention include, but are not limited to: ethylene vinyl acetate (EVA); ethylene methyl acrylate (EMA); polyethylenes such as, but not limited to, low density polyethylene (LDPE), linear low density polyethylene (LLDPE), high density polyethylene (HDPE), and ultra-high molecular weight polyethylene (UHMWPE); polypropylenes; ethylene-propylene rubbers; ethylene-propylene-diene rubbers; poly(1-butene); polystyrene; poly(2-butene); poly(1-pentene); poly(2-pentene); poly(3-methyl-1-pentene); poly(4-methyl-1-pentene); 1,2-poly-1,3-butadiene; 1,4-poly-1,3-butadiene; polyisoprene;

polychloroprene; poly(vinyl acetate); poly(vinylidene chloride); and mixtures and derivatives thereof.

The porous thermoplastic materials of the invention can further comprise materials such as, but not limited to, lubricants, colorants, fillers, and mixtures thereof. Suitable fillers include, but are not limited to: carbon black, cellulose fiber powder, siliceous fillers, polyethylene fibers and filaments, and mixtures thereof.

Sinterable thermoplastics other than those recited herein can also be used in this invention. As those skilled in the art are well aware, the ability of a thermoplastic to be sintered can be determined from its melt flow index (MFI). Melt flow indices of individual thermoplastics are known or can be readily determined by methods well known to those skilled in the art. For example, an extrusion plastometer made by Tinius Olsen Testing Machine Company, Willow Grove, Pa., can be used. The MFIs of thermoplastics suitable for use in this invention will depend on the particular porous thermoplastic material and/or the method used to prepare it. In general, however, the MFI of a thermoplastic suitable for use in the materials and methods of the invention is from about 0 to about 15. The temperatures at which individual thermoplastics sinter (i.e., their sintering temperatures) are also well known, or can be readily determined by routine methods such as, but not limited to, thermal mechanical analysis and dynamic mechanical thermal analysis.

The particles used to form the porous plastic to be sintered can be formed by several processes known in the art. One such process is cryogenic grinding. Cryogenic grinding can be used to prepare thermoplastic particles of varying sizes. But because cryogenic grinding provides little control over the sizes of the particles it produces, powders formed using this technique may be screened to ensure that the particles to be sintered are of a desired average size and size distribution.

Underwater pelletizing can also be used to form thermoplastic particles suitable for sintering. Although typically limited to the production of particles having diameters of greater than about 36 µM, underwater pelletizing offers several advantages. First, it provides accurate control over the average size of the particles produced, in many cases thereby eliminating the need for an additional screening step and reducing the amount of wasted material. A second advantage of underwater pelletizing, which is discussed further herein, is that it allows significant control over the particles' shape.

Underwater pelletizing is described, for example, in U.S. Pat. No. 6,551,608 to Yao and U.S. Published Patent Application No. U.S. 2003-0062311-A1, filed Aug. 23, 2002, Ser. No. 10/226,235, both of which are incorporated herein by reference in their entirety. Thermoplastic particle formation using underwater pelletizing typically requires an extruder or melt pump, an underwater pelletizer, and a drier. The thermoplastic resin is fed into an extruder or a melt pump and heated until semi-molten. The semi-molten material is then forced through a die. As the material emerges from the die, at least one rotating blade cuts it into pieces herein referred to as "pre-particles." The rate of extrusion and the speed of the rotating blade(s) determine the shape of the particles formed from the pre-particles, while the diameter of the die holes determine their average size. Water, or some other liquid or gas capable of increasing the rate at which the pre-particles cool, flows over the cutting blade(s) and through the cutting chamber. This coagulates the cut material (i.e., the pre-particles) into particles, which are then separated from the coolant (e.g., water), dried, and expelled into a holding container.

The average size of particles produced by underwater pelletizing can be accurately controlled and can range from about 0.014" (35.6 µM) to about 0.125" (318 µM) in diameter, depending upon the thermoplastic. Average particle size can be adjusted simply by changing dies, with larger sized dies yielding proportionally larger particles. The average shape of the particles can be optimized by manipulating the extrusion rate and the temperature of the water used in the process.

The resulting filter from the above processes and materials creates a filter that is sufficiently rigid such that it can be used without a core (not shown) if desired. A higher flow rate can be obtained if a core is not used because a core may restrict the flow of the filtrate across filter 100. Thus, there is a lower pressure drop across filter 100 if a core is not used. Also, no cage, as required in many prior art filters, is necessary with filter 100. Thus, fewer parts to the filter system are required, thereby reducing costs as well as simplifying assembly. Furthermore, no supporting or drainage areas are necessary for use with filter 100. Additionally, the lack of support layers, core, and cage means that there are no layers in filter 100 between which contaminants can be trapped. The lack of layers of filter material also provide for longer life, easier assembly, less failure, and the like because there are no layers that require seaming or sealing. Furthermore, because there are no layers, filter 100 is capable of vigorous backwashing and reuse.

Figure 4:
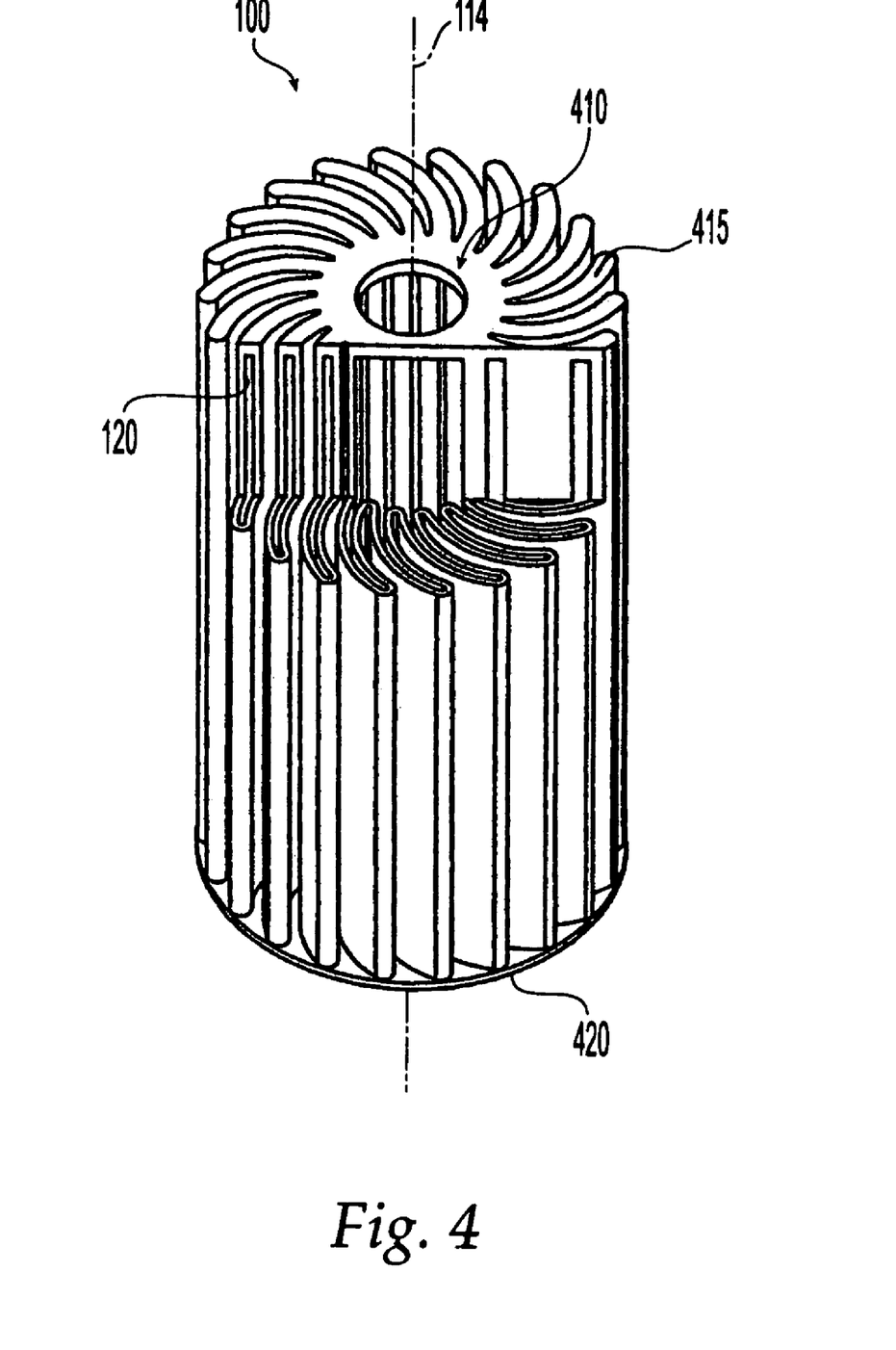
FIG. 4 shows a longitudinal partial cross-section of a filter according to another embodiment of the present invention.

End caps (not shown) can be placed over the longitudinal ends of filter 100 and attached to an outer housing (not shown) or filter 100 itself, thereby sealing the filter ends to end caps or a housing to the end caps. Various kinds of end caps may be used. For instance, typical Plastisol end caps, injection-molded end caps, or the like can be heat sealed onto filter 100 or hot melt end caps can be used. It will be appreciated that the use of end caps typically depends on the sealing technique to be used. Some traditional sealing techniques that can be used include including a gasket between the end cap and filter 100 and/or housing. The gasket forms a tight seal between the components when pressure is applied such that the filtrate must traverse through porous filter 100, thereby, filtering out contaminants. Another sealing technique for the end cap is spin welding. Spin welding is disclosed in U.S. Pat. No. 5,871,645 to Reed et al., which is incorporated herein by reference in its entirety. Spin welding is a technique in which a portion of the end cap extends adjacent the component to which it is to be welded. The portions to be welded are brought into contact. When the portions to be welded are spun relative to each other, heat is generated to weld the components together. Other methods of sealing the end caps include heat sealing, sealing by adhesives, or the like. In an alternate embodiment, the relative rigidity of filter 100 of the present invention allows filter 100 to be used without end caps. A filter with two open ends can be sealed with gaskets. FIG. 4 shows an additional embodiment in which a cartridge filter has one closed end or partially closed end 410, molded as one piece with filter 100. The ends of fingers 116 are closed such that any fluid in internal slots 120 must cross filter barrier 415 to exit filter 100. Accordingly, depending on the direction of fluid flow, any fluid external to filter 100 must cross filter barrier 415 to enter internal slot 120. The other end of filter 100 has a flange 420, so as to seal filter 100 directly to a filter housing (not shown). Flange 420 makes filter 100 a one piece molded cartridge requiring no other components to create a filter thus facilitating efficient manufacture and assembly of filter units. Flange 420 can be continuous with the material of the outer surface of fingers 116. Flange 420 can have the same overall outer diameter as filter 100 or can define a larger diameter than the overall outer diameter of filter 100. This effectively eliminates all other components or secondary processes associated with typical cartridge filters. Such components and/or secondary processes eliminated include, but are not limited to, the need for endcaps, gaskets, and secondary operation.

Filter 100 of the present invention can be used for any fluids (i.e., liquids and gases), such as water, solvents, air, or the like. According to an embodiment of the present invention, filter 100 can be used in industrial or recreational water filters as well as municipal filters. For example, a filter formed in accordance with the principles of the present invention can be used to remove other particles (e.g., sand) from water prior to desalination for potable use. Furthermore, in an alternative embodiment filter 100 can be used in a laboratory to filter microbial contaminants from a solution.

As described above, because filter 100 of the present invention has a relative rigidity it can be used as a substrate or support medium for a Diatomaceous Earth filter (which may have substantially the same appearance as filter 100). For instance, filter 100 of the present invention can be molded into the desired substrate configuration, pre-coated, or used as a support grid, such as for a Diatomaceous Earth filter. Such use benefits from the uniform structure and pore size of sintered porous plastics. The depth or thickness of the media prevents bleed-through upon system start-up, a common problem with existing Diatomaceous Earth filters. Furthermore, because the filter is durable and constructed from a porous thermoplastic, the filter can be aggressively backwashed and cleaned such that it can be reusable for long periods, unlike traditional Diatomaceous Earth support grids made from a fragile mesh.

Figure 5:
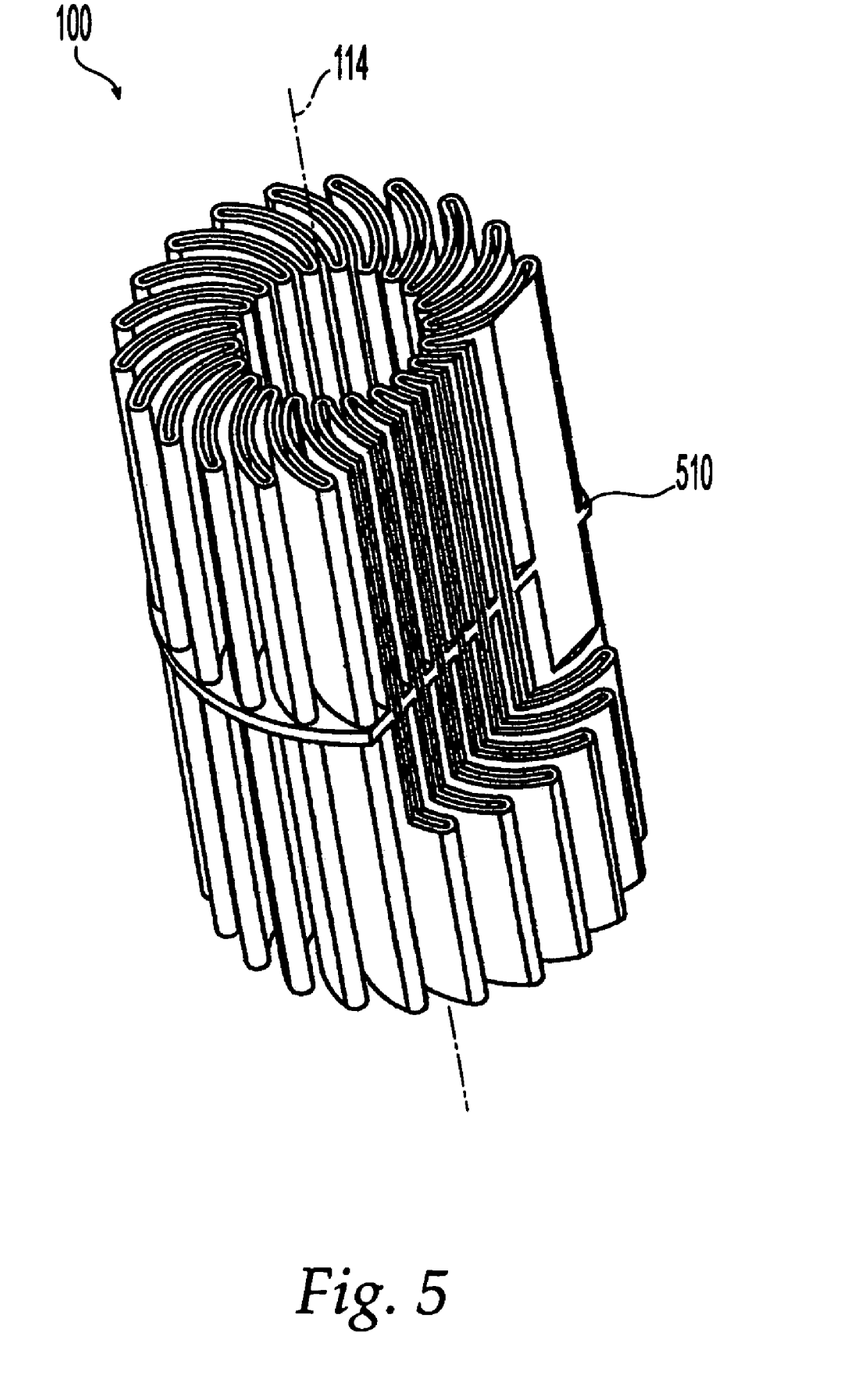
FIG. 5 shows a longitudinal partial cross-section of a filter according to still another embodiment of the present invention.

FIG. 5 shows another embodiment in which one or more support rings 510 can be molded into filter 100 to give filter 100 additional resistance to high pressure, in both directions of flow, or for other applications requiring additional resistance or rigidity to form. Support rings 510 are preferably constructed from the same porous plastic material as filter 100. Support rings 510 can both be positioned in the internal and/or external slots of filter 100 in an area requiring additional support. Alternatively, support rings 510 can be injection molded and slid down over and/or inside fingers 116 and placed appropriately for a particular application.

In alternate embodiments, the number of fingers 116 can be variable and depend on the filtering parameters to be satisfied in a particular application. For example, there may be a single finger 116 that extends radially outwardly in a spiraling manner, such as to generate one spiraling slot (not shown). In another embodiment there may be a plurality of fingers 116 that extend radially outwardly creating a plurality of slots 300 as shown in the Figures. As will be appreciated by one of ordinary skill in the art, the radius curvature of fingers 116 therefore depends upon multiple factors including, but not limited to, the number of fingers, the thickness of the filtering material, the radius of curvature of the ends of the fingers, the size of the slots, the overall dimensions of the filter, and the like.

While the foregoing description and drawings represent embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description. The cartridge or parts of the cartridge can be made larger or smaller based on the intended application. Furthermore, multiples of the cartridge can be stacked together to achieve more surface area and thereby gain more capacity. Also, multiple stacks of multiple cartridges may be used.

What is claimed:

1. A single layered filter comprising a first end, a second end, a longitudinal axis extending between said first and second ends, and an inner diameter defined by a hollow longitudinally extending center, said single layered filter comprising:

a self-supporting rigid porous thermoplastic filter material;

radially-outwardly extending self-supporting curved fingers made of said filter material curving around said longitudinal axis and having base ends near said longitudinal axis and outer edges at extremities spaced from said longitudinal axis; wherein:

said fingers each having a first curved face and a second curved face, the first curved face in communication with the hollow longitudinally extending center and said second curved face facing opposite of said first curved face; and said fingers are spaced apart from one another such that the second curved faces of adjacent fingers do not touch each other and slots are formed between the second curved faces of said adjacent fingers and the first curved faces of adjacent fingers do not touch each other and internal slots are formed between the first curved faces of said adjacent fingers.

2. The filter of claim 1, further comprising antimicrobial or antiviral agents.

3. The filter of claim 1, wherein said fingers are substantially evenly spaced apart from one another.

4. The filter of claim 1, wherein said fingers are spaced apart about 0.088 cm.

5. The filter of claim 1, wherein said base ends of said fingers have an inner radius of curvature of at least about 0.0762 cm.

6. The filter of claim 1, wherein said base ends of said fingers have an outer radius of curvature of at least about 0.330 cm.

7. The filter of claim 1, wherein said outer edges of said fingers have an inner radius of curvature of at least about 0.127 cm.

8. The filter of claim 1, wherein said outer edges of said fingers have an outer radius of curvature of at least about 0.381 cm.

9. The filter of claim 1, wherein said fingers have one of a smooth, a serpentine, a textured, and a ridged surface.

10. The filter of claim 1, further comprising at least one end cap coupled with an end of said filter.

11. The filter of claim 1, further comprising a gasket adapted to seal at least one of said first and second ends of said filter.

12. The filter of claim 1, wherein said porous thermoplastic filter material has a pore size at least about 1 µm.

13. The filter of claim 1, wherein said porous thermoplastic filter material has a pore size at most about 500 µm.

14. The filter of claim 1, wherein said filter has a porosity of at least about 30%.

15. The filter of claim 1, wherein said filter has a porosity of at most about 90%.

16. The filter of claim 1, further comprising two or more filters stacked upon another.

17. The filter of claim 1, further comprising support rings incorporated into said filter.

18. The filter of claim 1, wherein said filter is configured and dimensioned to be a Diatomaceous Earth filter.

19. The filter of claim 1, wherein said internal slot has a width of at least about 0.254 cm.

20. The filter of claim 1, wherein said filter is formed using an extrusion or pultrusion process.

21. The filter of claim 1, wherein said fingers define an outer diameter of said filter selected to correspond to the inner diameter of a standard filter holding device.

22. The filter of claim 1, wherein said filter material is sufficiently durable to permit ready cleaning or backwashing.

23. The filter of claim 1 further comprising a flange, wherein the flange is continuous with at least one of the first and second ends of the filter.

24. The filter of claim 23, wherein the flange comprises the self-supporting porous thermoplastic filter material.

25. The filter of claim 1, wherein the slots are spaced apart by a distance ranging from a value obtained by multiplying a thickness of a finger by 0.60 to a value obtained by multiplying the thickness of a finger by 2.0.

* * * * *